US009879986B2

(12) United States Patent
Carlson et al.

(10) Patent No.: US 9,879,986 B2
(45) Date of Patent: Jan. 30, 2018

(54) SYSTEMS AND METHODS FOR CONTROLLING ROTORCRAFT EXTERNAL LOADS

(71) Applicant: Sikorsky Aircraft Corporation, Stratford, CT (US)

(72) Inventors: Sean S. Carlson, New Milford, CT (US); Cauvin Polycarpe, Middletown, CT (US); George N. Loussides, Branford, CT (US); Garrett Pitcher, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 101 days.

(21) Appl. No.: 15/085,157

(22) Filed: Mar. 30, 2016

(65) Prior Publication Data

US 2017/0284795 A1    Oct. 5, 2017

(51) Int. Cl.
| | |
|---|---|
| *G01B 11/26* | (2006.01) |
| *B64C 17/00* | (2006.01) |
| *B64C 27/04* | (2006.01) |
| *B64D 1/22* | (2006.01) |
| *B64D 45/00* | (2006.01) |
| *B64D 9/00* | (2006.01) |
| *G05D 1/02* | (2006.01) |
| *G06T 7/00* | (2017.01) |

(52) U.S. Cl.
CPC .............. *G01B 11/26* (2013.01); *B64C 17/00* (2013.01); *B64C 27/04* (2013.01); *B64D 1/22* (2013.01); *B64D 9/00* (2013.01); *B64D 45/0005* (2013.01); *G05D 1/0202* (2013.01); *G06T 7/0042* (2013.01); *G06T 2207/10028* (2013.01); *G06T 2207/20076* (2013.01); *G06T 2207/30252* (2013.01)

(58) Field of Classification Search
CPC ...... G01B 11/26; G05D 1/0202; B64C 17/00; B64C 27/04; B64D 1/22; B64D 9/00; B64D 45/0005; G06T 7/0042; G06T 2207/10028; G06T 2207/20076; G06T 2207/30252
See application file for complete search history.

(56) References Cited

U.S. PATENT DOCUMENTS

| | | |
|---|---|---|
| 8,190,307 B2 | 5/2012 | Omar |
| 8,622,336 B2 | 1/2014 | Brenner et al. |

(Continued)

FOREIGN PATENT DOCUMENTS

EP    1146317 A1    10/2001

OTHER PUBLICATIONS

Mebarki et al. "Toward Image-Based Visual Servoing for Cooperative Aerial Manipulation." IEEE International Conference on Robotics and Automation, May 26, 2015, pp. 6074-6080.*

(Continued)

*Primary Examiner* — Jon Chang
(74) *Attorney, Agent, or Firm* — Locke Lord LLP; Scott D. Wofsy; Christopher J. Cillié

(57) ABSTRACT

A method of determining cable angle includes acquiring image data of a cable and a load coupled to a rotorcraft using three-dimensional (3D) spatial perception system, constructing an image of the cable and load using the image data, and determining the angle of the cable relative to the external load at an interface of the cable and external load based on the image.

15 Claims, 4 Drawing Sheets

(56) References Cited

U.S. PATENT DOCUMENTS

| | | |
|---|---|---|
| 9,146,557 B1 | 9/2015 | Ahmed et al. |
| 9,718,650 B2 * | 8/2017 | Lee .................. B66C 13/46 |
| 2015/0331427 A1 | 11/2015 | Chaudary |
| 2016/0009393 A1 * | 1/2016 | Repp .................. B64D 1/22 |
| | | 701/34.4 |

OTHER PUBLICATIONS

Zhao et al. "Localization of Multiple Insulators by Orientation Angle Detection and Binary Shape Prior Knowledge." IEEE Transactions on Dielectrics and Electrical Insulation, vol. 22, No. 6, Dec. 2015, pp. 3421-3428.*

Yan et al. "An Airborne Multi-Angle Power Line Inspection System." IEEE International Geoscience and Remote Sensing Symposium, Jul. 23, 2007, pp. 2913-2915.*

* cited by examiner

SYSTEMS AND METHODS FOR CONTROLLING ROTORCRAFT EXTERNAL LOADS

BACKGROUND OF THE INVENTION

1. Field of the Invention

The present disclosure relates to rotorcraft external load control, and more particularly to determining cable angle in cables coupling external loads to rotorcraft.

2. Description of Related Art

Rotorcraft, like helicopters, commonly maneuver with external loads such as sling loads, sonar dipping buoys, mine sleds, etc. The external loads generally couple to the rotorcraft through a lifting device and are exposed to the rotorcraft operating environment. The environment typically exerts forces on the external load, such as from wind, wave action, and ocean currents, and compensation may be required in order for the rotorcraft to maintain the external load in a desired disposition. Since forces exerted on the load can influence rotorcraft performance and/or the integrity of the external load, rotorcraft aircrew generally monitor the external cargo during flight, typically through a measurement device associated with the lifting device. For example, the angle of the lifting device relative to the rotorcraft may be acquired during flight and feedback to avoid undesirable lifting device deflection. The effectiveness of measurements can be influenced by the measurement location, accuracy of the measurement device, and the relationship of the measurements to the true disposition of the external load relative to the rotorcraft.

Such conventional methods and systems have generally been considered satisfactory for their intended purpose. However, there is still a need in the art for improved systems and methods for controlling rotorcraft external loads. The present disclosure provides a solution for this need.

SUMMARY OF THE INVENTION

A method of determining cable angle includes acquiring image data of a cable and a load coupled to a rotorcraft using a three-dimensional (3D) spatial perception system. An image is constructed of the cable and the external load using the image data, and a determination is made of the angle of the cable relative to the external load at an interface of the cable and external load based on the image.

In certain embodiments, the 3D spatial perception system can include a Light Detection and Ranging (LIDAR) system. Acquiring the image data can include acquiring LIDAR image data. Acquiring the image data can include emitting electromagnetic radiation having a wavelength between about 600 nanometers and about 1600 nanometers from the rotorcraft. Acquiring the image data can include illuminating the cable and the load with an illuminator fixed relative to the rotorcraft, reflecting the illumination from the cable and load to the rotorcraft, and receiving reflected illumination at a sensor coupled to the rotorcraft. Acquiring the image data can including scanning the emitted electromagnetic radiation through a field of view including the cable, the external load, and the surface of a body of water into which the external load is immersed.

In accordance with certain embodiments, constructing the image can include constructing a three-dimensional point cloud of the cable, the load, and the environs of the cable and load using a processor fixed relative to the rotorcraft. The determined cable angle can be compared to a predetermined cable angle limit. A future cable angle can be predicted using the determined cable angle. A future cable angle can be predicted using the determined cable angle and a rotorcraft state. The rotorcraft state can be the current rotorcraft state, i.e. the rotorcraft when the image data was acquired. Based on the determined cable angle or the predicted future cable angle, an input can be provided to a flight control system of the rotorcraft. The method can also include receiving rotorcraft state data, and determining the flight control input for the rotorcraft using the rotorcraft state data and one or more of the determined cable angle and the predicted future cable angle between the external load and the cable.

It is also contemplated that in certain embodiments the image data can be a first image data set, the image can be a first image, the determined cable angle can be a first determined cable angle, and the method can further include acquiring a second image data set including the cable and external load. A second image can be constructed from the second image data set, and the second cable angle can be determined from the second image. The second cable angle can be compared to the first cable angle, and a predicted future cable angle can be determined based on the comparison of the first and second cable angles. An input can be provided to the rotorcraft flight controls based on the predicted future cable angle.

A system for determining a cable angle defined between an external load and a cable coupling the external load to a rotorcraft includes a sensor, a processor operatively connected to the sensor, and a non-transitory machine-readable memory communicative with the processor. The memory has instructions recorded on it that, when read by the processor, causes the processor to acquire image data of the cable and the external load, construct an image including the cable and the external load using the image data, and determine a cable angle defined between the cable and the external load.

In certain embodiments, the instructions recorded on the memory cause the processor to execute one or more of the steps of the above-described method. The system can include a Light Detection and Ranging system operatively connected to the processor. The system can include an illuminator operatively connected to the processor. The illuminator can be configured to illuminate the cable and external load with illumination having a wavelength between about 600 nanometers and about 1600 nanometers. The illuminator can be a scanning illuminator or a fixed field of view illuminator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
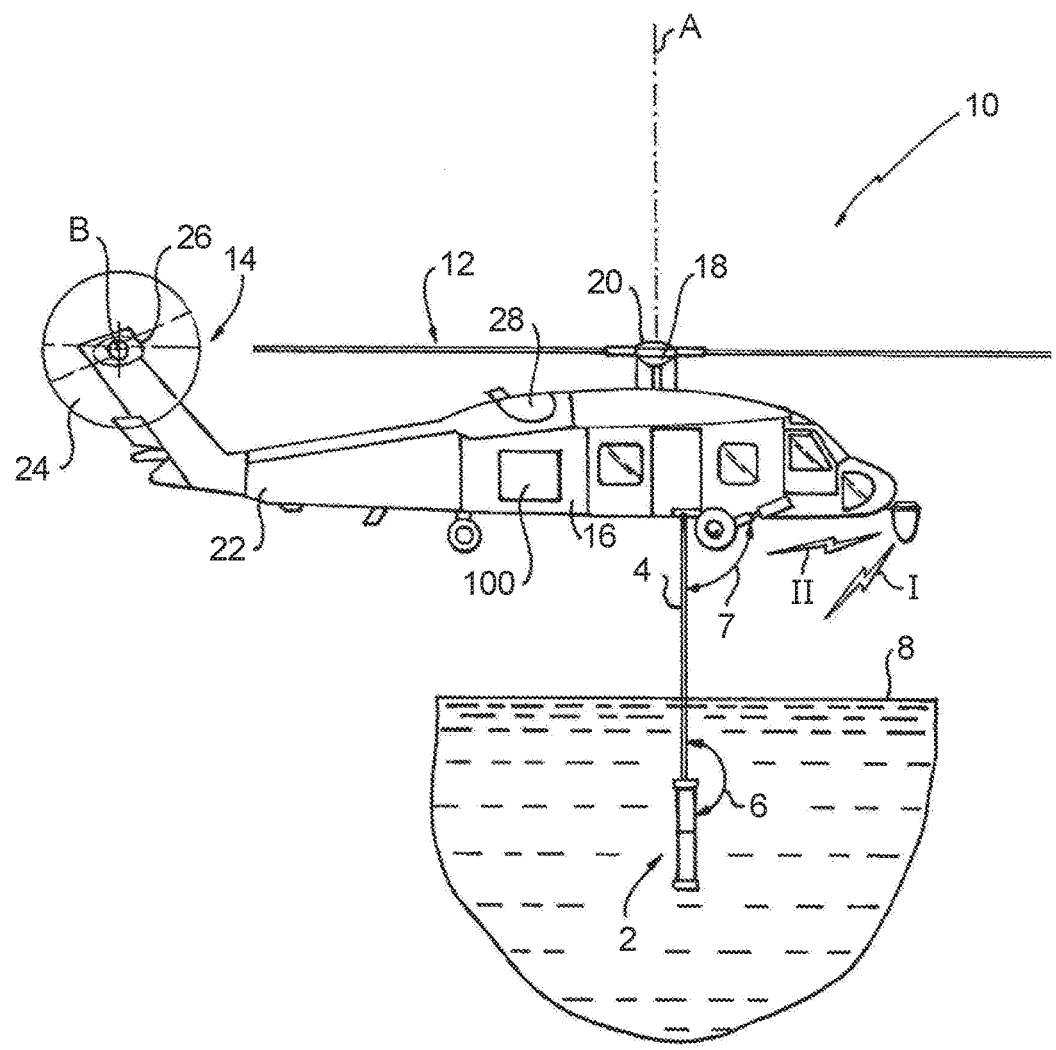
FIG. 1 is a schematic view of an exemplary embodiment of a rotorcraft with a perception system for determining cable angle constructed in accordance with the present disclosure, showing the perception system fixed relative to the rotorcraft.

Reference will now be made to the drawings wherein like reference numerals identify similar structural features or aspects of the subject disclosure. For purposes of explanation and illustration, and not limitation, a partial view of an exemplary embodiment of a rotorcraft in accordance with the disclosure is shown in FIG. 1 and is designated generally by reference character 10. Other embodiments of rotorcraft and systems for controlling loads carried by rotorcraft in accordance with the disclosure, or aspects thereof, are provided in FIGS. 2-4, as will be described. The systems and methods described herein can be used to control cable angle during helicopter sonar buoy dipping operations, however the invention is not limited to a particular type of helicopter operational regime or to helicopters in general.

With reference to FIG. 1, rotorcraft 10 is shown. Rotorcraft 10 includes a main rotor system 12 and an anti-torque system, for example, a tail rotor system 14. Main rotor system 12 is supported for rotation about a main rotor axis A by an airframe 16 and includes a plurality of main rotor blades 18. Main rotor blades 18 are connected to a main rotor hub 20, which is rotatably disposed along main rotor axis A. Tail rotor system 14 is supported for rotation about a tail rotor axis B by a longitudinally extending tail 22, and includes a plurality of tail rotor blades 24 connected to a tail rotor hub 26, which is rotatably disposed along tail rotor axis B. Main rotor system 12 and tail rotor system 14 are driven to rotate about respective main rotor axis A and tail rotor axis B by one or more turbine engines 28 carried by airframe 16 for providing lift and thrust to rotorcraft 10. Although a particular configuration of rotorcraft 10 is illustrated in FIG. 1 and is described in the disclosed embodiments, it is to be appreciated and understood that other vehicles including fixed-wing as well as rotary-wing aircraft may also benefit from the embodiments disclosed.

Rotorcraft 10 carries an external load, e.g., a sonar buoy 2. Sonar buoy 2 is coupled to rotorcraft 10 by a cable 4. A first cable angle 6 is defined between sonar buoy 2 and cable 4. A second cable angle 7 is defined between cable 4 and a component of rotorcraft 10, e.g., between cable 4 and airframe 16. As will be appreciated by those of skill in the art, the operating environs of rotorcraft 10 exert forces on sonar buoy 2 and cable 4 which influence the magnitude of first cable angle 6 and/or second cable angle 7 at any given moment in time. For example, first cable angle 6 and/or second cable angle 7 may be within different angular ranges depending upon the flight regime of rotorcraft 10 and the location of sonar buoy 2 in relation to the ocean surface. As will also be appreciated by those of skill in the art in view of the present disclosure, first cable angle 6 and/or second cable angle 7 can indicate whether sonar buoy 2 is positioned properly for acquiring measurements and/or is at risk for damage by wave action present in the ocean surface, e.g., ocean surface 8.

Rotorcraft 10 carries a three-dimensional (3D) spatial perception system 100 for determining one or more cable angles associated with an external load of rotorcraft, e.g., first cable angle 6 defined between cable 4 and sonar buoy 2 and/or second cable angle 7 defined between airframe 16 and cable 4. In illustrated exemplary embodiment, 3D spatial perception system 100 includes a Light Detection and Ranging (LIDAR) based perception system. Although described in the exemplary embodiment as a LIDAR-based perception system, those of skill in the art will appreciate in view of the present disclosure that other types of imaging systems may also be used to generate image data suitable for determining cable angle between an external load and a cable coupling the external load to a rotorcraft.

Figure 2:
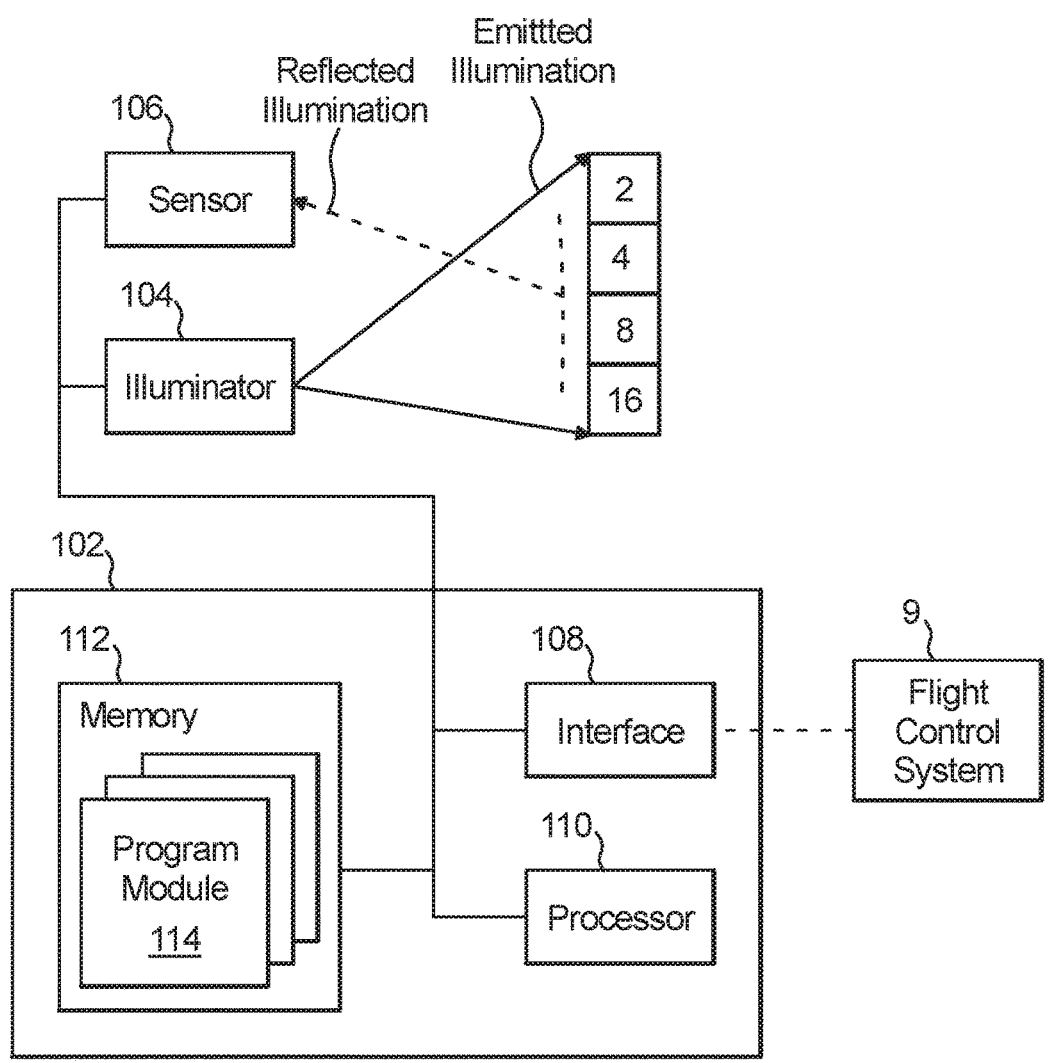
FIG. 2 is a schematic view of the perception system of FIG. 1, showing an illuminator operatively associated with the system scanning the load, cable, and environs with electromagnetic radiation to illuminate the load, cable, and rotorcraft operating environs.

With reference to FIG. 2, 3D spatial perception system 100 is shown. 3D Spatial perception system 100 includes a controller 102 operatively associated with an illuminator 104 and a sensor 106, and optionally with a flight control system 9 of rotorcraft 10 (shown in FIG. 1). Controller 102 includes an interface 108, a processor 110, and a non-transitory machine-readable memory 112. Memory 112 has a plurality of program modules 114 recorded thereon that, when read by processor 110, causes processor 110 to execute certain operations. In this respect the instructions cause processor 110 to acquire LIDAR image data of the cable and the external load coupled to the rotorcraft, construct an image including the cable and the external load using the LIDAR image data, and determine a cable angle defined between the cable and the external load, as will be detailed below.

Illuminator 104 is configured and adapted to illuminate the environs external to rotorcraft 10 (shown in FIG. 1) with illumination. In this respect illuminator 104 emits electromagnetic radiation having a wavelength between about 600 nanometers and about 1600 nanometers. In embodiments, the electromagnetic radiation within a 600 nanometer to 1000 nanometer band, rendering the emitted electromagnetic radiation eye-safe to rotorcraft crewman. In certain embodiments, the electromagnetic radiation has a wavelength that is about 1550 nanometers, rendering the radiation invisible to night-vision equipment employed by the rotorcraft crewman. The electromagnetic radiation may be scanned over a field of view of the illuminator, the field of view including cable 4, sonar buoy 2, and a portion of ocean surface 8 in the illustrated exemplary embodiment. It is to be understood and appreciated that the electromagnetic radiation described above is exemplary and for purposes of illustration, and electromagnetic radiation of wavelengths outside of the indicated range may be used for purposes determining first cable angle 6 and second cable angle 7.

Sensor 106 is configured and adapted to receive a portion of the emitted electromagnetic radiation reflected by one or more of cable 4, sonar buoy 2, and airframe 16, and ocean surface 8 and provide image data of the elements to controller 102. In this respect sensor 106 can include one or more of a scanner, optics, a photodetector, and receiver electronics, as suitable for a given application. In the illustrated exemplary embodiment, sensor 106 is fixed relative to rotorcraft 10 and remote relative to the connection location of cable 4 with rotorcraft 10. For example, sensor 106 may be mounted in a chin-mounted gimbal or on a tail-mounted platform.

Figure 3:
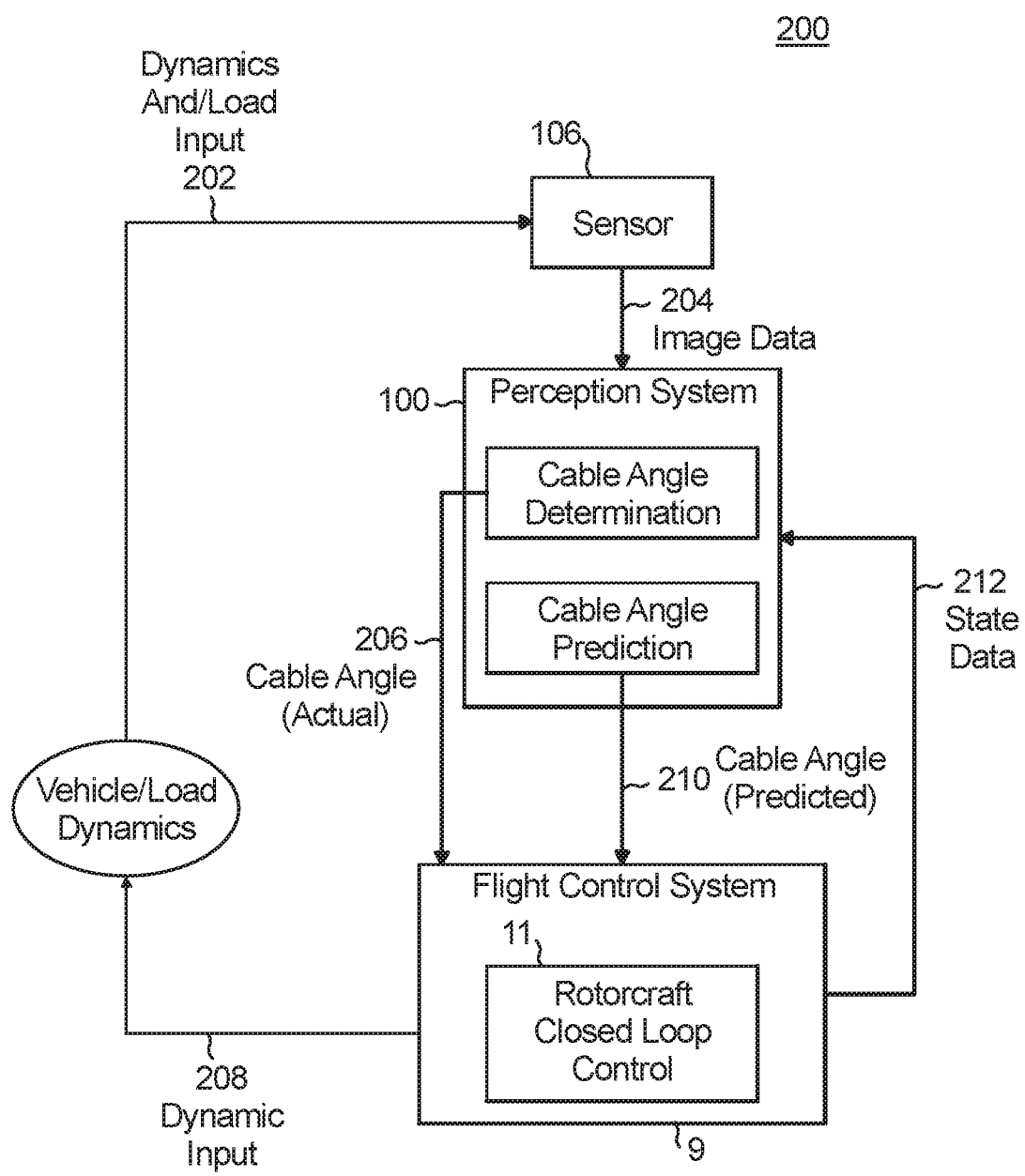
FIG. 3 is a schematic diagram of the perception system interacting with the rotorcraft of FIG. 1, showing the perception system providing a determined cable angle and/or a predicated cable angle to the flight control system of the rotorcraft.

With reference to FIG. 3, a process flow diagram for a method 200 for controlling cable angle between an external load, e.g., sonar buoy 2 (shown in FIG. 1), and a cable, e.g., cable 4 (shown in FIG. 1), is shown. As indicated at the top of FIG. 3, sensor 106 receives dynamic input 202 from rotorcraft 10 (shown in FIG. 1) and/or sonar buoy 2 coupled to rotorcraft 10 by cable 4. Sensor 106 acquires image data 204 of sonar buoy 2 and cable 4 (as well as the surrounding environs, e.g., ocean surface 8), and provides the image data to 3D spatial perception system 100.

3D spatial perception system 100 receives image data 204, determines a cable angle defined between sonar buoy 2 and cable 4, and provides the determined cable angle 206 to flight control system 9 of rotorcraft 10. Using the determined cable angle 206, flight control system 9 provides one or more dynamic inputs 208 to rotorcraft 10, which may be accomplished using a closed loop control module 11 of flight control system 9. In embodiments, 3D spatial perception system 100 may alternatively (or additionally) provide a cable angle prediction 210 to flight control system 9, which flight control system 9 uses in generating the one or more dynamic inputs 208 provided to rotorcraft 10. In certain embodiments, providing cable angle prediction 210 to flight control system 9 can include receiving state data 212 provided by flight control system 9 at 3D spatial perception system 100. Examples of state data include rotorcraft flight regime, e.g., hover, attitude, altitude, level flight, power level, etc. Vehicle state can also input to 3D spatial perception system 100, such as from the aircraft mounting the 3D spatial perception system 100. Referring again to FIG. 1, electromagnetic radiation may be directed at one or more of airframe 16, cable 4, sonar buoy 2, and/or ocean surface 8, electromagnetic radiation I being directed away from rotorcraft 10 and towards sonar buoy 2, and electromagnetic radiation II being directed from an illumination coupled to rotorcraft 10 and toward airframe 16 from outside of airframe 16.

Figure 4:
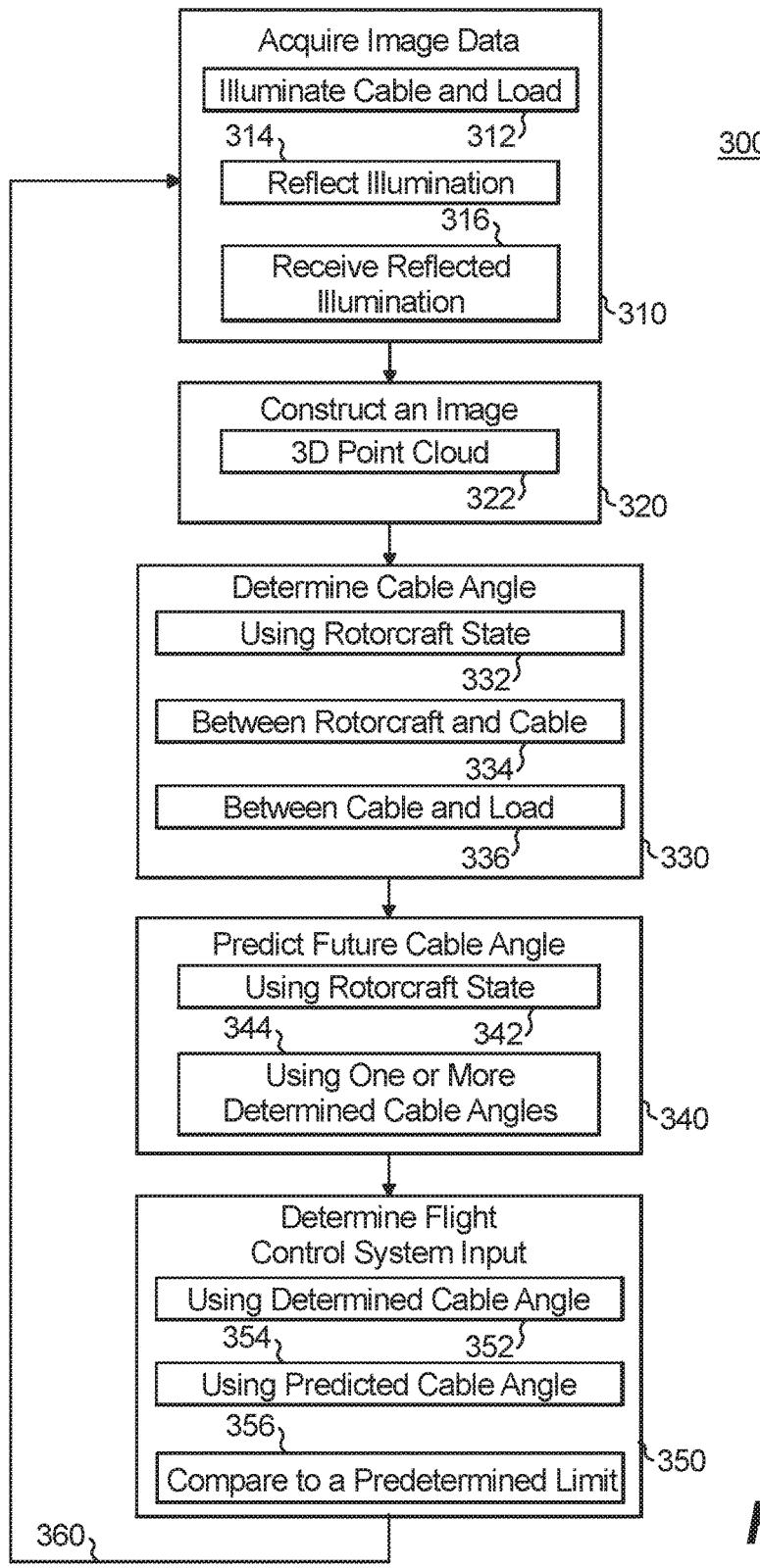
FIG. 4 is a process flow diagram of a method of determining cable angle between an external load and a cable coupling the external load to a rotorcraft, showing steps of the method.

With reference to FIG. 4, a method 300 of determining cable angle is shown. Method 300 generally includes acquiring LIDAR image data of a cable, e.g., cable 4 (shown in FIG. 1) and an external load, e.g., sonar buoy 2 (shown in FIG. 1) coupled to a rotorcraft, e.g., rotorcraft 10 (shown in FIG. 1), as shown with box 310. Method 300 also includes constructing an image of the cable and external load using the LIDAR image data, as shown in with box 320, and determining an angle, e.g., first cable angle 6 (shown in FIG. 1) between the cable and the external load and/or second cable angle 7 (shown in FIG. 1), as shown with box 330. Method 300 can also include predicting a future cable angle using the image data, as shown with box 340, and determining an input for a flight control system, e.g., flight control system 9 (shown in FIG. 2), using the cable angle, as shown with box 350.

Acquiring 310 the image data includes illuminating one or more of the cable, external load, and the environs of the external load, e.g., ocean surface 8, as shown with box 312. Acquiring 310 the image data also includes reflecting from the one or more of the cable, external loads, and environs of the external a portion of the illumination emitted towards the elements, as shown with box 314. Acquiring 310 the image data includes receiving the reflected illumination at a LIDAR sensor, e.g., LIDAR sensor 106 (shown in FIG. 2), as shown with box 316.

Constructing 320 an image of the cable and the external load using the LIDAR image data includes constructing a three-dimensional (3D) point cloud, as shown with box 322. The 3D point cloud includes points indicative of the disposition of the external load relative to the cable, and in embodiments may further include points indicative of the ocean surface relative to the external load and cable. As shown with box 336, cable angle can be determined between the external load and the cable. Alternatively or additionally, cable angle can be determined between the rotorcraft airframe and the cable, as shown with box 334. From the 3D point cloud, relative positions, ranges, and angles of the external load and cable may be determined using a perception system, e.g., 3D spatial perception system 100 (shown in FIG. 2).

Predicting 340 a future cable angle can include using a rotorcraft state, as shown with box 342. The rotorcraft state can be provided to the LIDAR perception system by the rotorcraft flight control system. Predicting 340 the future cable angle can include using a first determined cable angle and at least one second determined cable angle, as shown with box 344. The determined cable angles can be representative of the cable angle at different times, and may be from determinations made using image data sets acquired at different times. In certain embodiments, a future cable angle prediction is modified based on a received rotorcraft state indicative of the state of the rotorcraft at the time that the cable angle determination was made. This allows for incorporation into the predicted cable angle the dynamics of the rotorcraft that may influence the load position, cable position, and angles between the cable and external load and the cable and rotorcraft airframe.

Determining 350 a flight control system input can include using the determined cable, as shown with box 352. Based on the determined cable input, the flight control system can alter the flight regime of the rotorcraft, e.g., rotorcraft 10 (shown in FIG. 1), such as by changing a turn radius or altering a hover altitude, using a closed loop control module, e.g., control module 11 (shown in FIG. 3). Determining 350 a flight control system input can include using a predicted cable angle, as shown with box 354, and/or by comparing the determined cable angle or predicted cable angle against a predetermined cable angle limit, as shown with box 356. As indicated by arrow 360, the cable angle can be determined iteratively with generating flight control systems input, the rotorcraft flight being determined (at least in part) by the angle defined between the external load and the cable.

In some rotorcraft external cargo movement operations it can be important to know the specific cable angle such as in sonar dipping, towing, and certain cargo movement operations. Cable angle measurements can be acquired in certain flight modes and provided to the flight control system as feedback, thereby potentially reducing (or eliminating) undesirable cable deflection by positioning the rotorcraft according to the feedback. However, performance of such angle sensing can be limited by the position of the sensor as well as the sensor's ability to accurately measure cable angle at the external load.

In embodiments described herein, a 3D spatial perception system is used to determined cable angle. This provides for relatively precise measurements of load position at long ranges. In certain embodiments, the 3D spatial perception system employs a LIDAR perception system, which constructs a 3D point cloud of the external load and cable. From the 3D point cloud, current relative positions of the cable and external load are derived, as are ranges, angles, etc. of the external load and cable. It is contemplated that the system can determine cable angle between the external load and the cable, cable angle between the rotorcraft airframe and the external load, and cable angle between both the cable and external load as well as the cable angle between the cable and rotorcraft airframe.

In accordance with certain embodiments, the perception system is communicative with a flight control system of a rotorcraft to measure current cable angle, predict future cable angle based on rotorcraft and external load dynamics, and provide inputs to the rotorcraft flight control system to position the rotorcraft in view of a desired cable angle (or reduced cable angle error relative to a predetermined angle limit). It is contemplated that the perception system communication with rotorcraft flight control system can provide improved external load positioning and reduce the likelihood of external load damage due to positioning error, such as in rotorcraft sonar dipping operations. It is also contemplated that the perception system communication with rotorcraft flight control system can provide improved control of load swing, reducing the likelihood of cable to airframe contact, such as during towing and/or sling load rotorcraft operations.

The methods and systems of the present disclosure, as described above and shown in the drawings, provide for cable angle detection systems and methods with superior properties including improved external load control. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of determining cable angle, comprising:
   acquiring, by a three-dimensional (3D) spatial perception system carried by a rotorcraft, image data of a cable and an external load coupled to the rotorcraft by the cable; and
   determining a cable angle defined between at least one of (a) the cable and the external load, and (b) the cable and the rotorcraft using the image data acquired by the 3D spatial perception system.

2. The method as recited in claim 1, wherein acquiring the image data comprises:
   illuminating the cable and the external load with an illuminator fixed relative to the rotorcraft;
   reflecting the illumination from the cable and the external load; and
   receiving reflected illumination at a sensor coupled to the rotorcraft.

3. The method as recited in claim 1, wherein acquiring the image data includes emitting electromagnetic radiation from a Light Detection and Ranging (LIDAR) system having a wavelength between about 600 nanometers and about 1600 nanometers from the rotorcraft.

4. The method as recited in claim 1, further including constructing an image of the cable and the external load using the image data by constructing a three-dimensional point cloud of the cable, the external load, and the environs of the cable and the external load using a processor fixed relative to the rotorcraft.

5. The method as recited in claim 1, wherein the method further includes comparing the determined cable angle to a predetermined cable angle limit.

6. The method as recited in claim 1, further including receiving a rotorcraft state, and predicting a future cable angle using the determined cable angle and the rotorcraft state.

7. The method as recited in claim 1, further including providing an input to a flight control system of the rotorcraft based on the determined cable angle.

8. The method as recited in claim 1, further including:
   receiving rotorcraft state data at a processor fixed relative to the rotorcraft; and
   determining a flight control input for the rotorcraft using the rotorcraft state data and the determined cable angle.

9. The method as recited in claim 1, wherein the image data is a first image data set and the determined cable angle is a first determined cable angle, the method further including:
   acquiring a second image data set of the cable and the external load;
   constructing a second image of the cable and external load using the second image data set;
   determining a second cable angle between the cable and the external load using the second image;
   comparing the second cable angle with the first cable angle; and
   predicting a future cable angle using the comparison of the second cable angle and the first cable angle.

10. A three-dimensional perception system for determining a cable angle, comprising:
    a sensor;
    a processor operatively connected to the sensor; and
    a non-transitory machine-readable memory communicative with the processor and having instructions recorded thereon that, when read by the processor, cause the processor to:
    acquire image data of a cable and an external load coupled to a rotorcraft;
    construct an image of the cable and the external load using the image data; and
    determine a cable angle defined between at least one of (a) the cable and the external load, and (b) the cable and the rotorcraft, based on the image.

11. The system as recited in claim 10, further including a Light Detection and Ranging (LIDAR) illuminator operatively connected to the processor and configured to illuminate the external load with illumination having a wavelength between about 600 nanometers and about 1600 nanometers.

12. The system as recited in claim 10, wherein the instructions recorded on the memory further cause the processor to:
    illuminate the cable and the external load with an illuminator fixed relative to the rotorcraft;
    reflect the illumination from the cable and the external load;
    receive illumination reflected from the cable and the external load at the sensor; and
    construct a three-dimensional point cloud of the cable, the external load, and the environs of the cable and external load using a processor fixed relative to the rotorcraft.

13. The system as recited in claim 10, wherein the instructions recorded on the memory further cause the processor to:
    compare the determined cable angle to a predetermined cable angle limit;
    predict a future cable angle using the determined cable angle; and
    provide an input to a flight control system of the rotorcraft based on at least one of the determined cable angle, the comparison of the predetermined cable angle limit and the determined cable angle, and the predicted future cable angle.

14. The system as recited in claim 10, wherein the image data is a first image data set and the determined cable angle is a first determined cable angle, and wherein the instructions recorded on the memory further cause the processor to:

acquire a second image data set of the cable and the external load;

construct a second image of the cable and the external load using the second image data set;

determine a second cable angle defined between the cable and the external load using the second image;

compare the second cable angle with the first cable angle; and predict a future cable angle using the comparison of the second cable angle and the first cable angle.

15. The system as recited in claim 10, wherein the instructions recorded on the memory further cause the processor to receive rotorcraft state data and determine a flight control input for the rotorcraft using the rotorcraft state data and the determined cable angle between at least one of (a) the cable and the external load, and (b) the cable and the rotorcraft.

* * * * *